A. L. MOWRY.
Car Wheel.
No. 17,442.
Patented June 2, 1857.
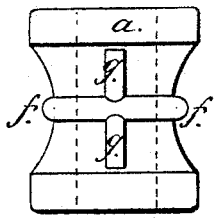
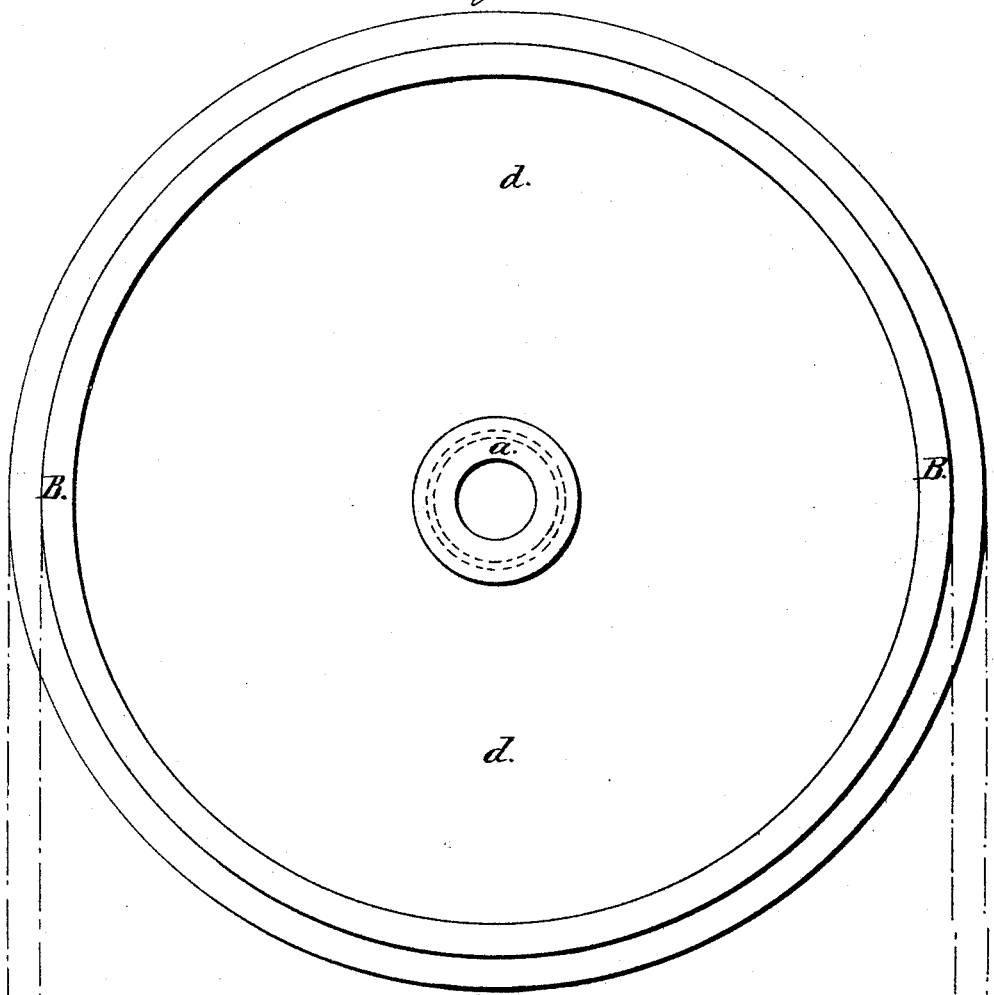
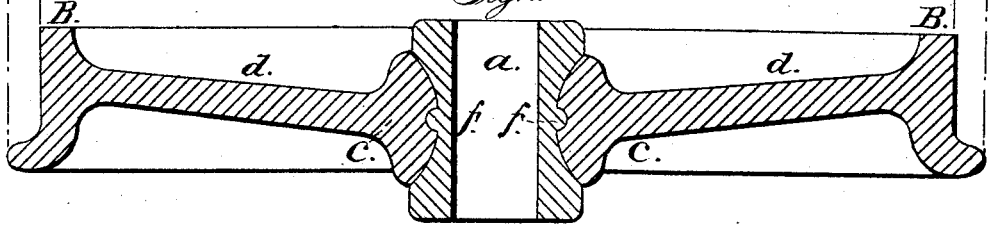

UNITED STATES PATENT OFFICE.

A. L. MOWRY, OF CINCINNATI, OHIO.

CAST-IRON CAR-WHEEL.

Specification of Letters Patent No. 17,442, dated June 2, 1857.

*To all whom it may concern:*

Be it known that I, ALBERT L. MOWRY, of the city of Cincinnati, in the county of Hamilton and State of Ohio, have invented a new and useful Improvement in Car-Wheels for Railroad-Cars; and I do hereby declare that the following is a full and exact description thereof, reference being had to the accompanying drawings and to the letters of reference marked thereon and made to form part of this specification.

Similar letters refer to like parts of the improvement.

The object of my improvement consists in making a wheel free from strain—that strain which is more or less produced by the unequal cooling of the parts of the wheel.

The hubs of my wheels are cast separately and placed in the mold of the wheel, and the wheel then is cast around the hub, as represented in Figure 1, there being a convex channel made around the outside of the hub, in which the metal runs, to prevent the hub from slipping longitudinally, and the proportion of the wheel at the tread (B,) disk (d) and swell (C) around the hub are such in the quantity of metal that each particular part contains such a quantity that all of the different portions of the wheel will cool simultaneously, and thus prevent all strain from any part of the wheel by having all parts of the wheel to cool alike, and at the same time—the tread (B) and swell (C) around the hub of the wheel will contain more metal in a given space than there is in the disk (d) for the tread (B,) and swell (C) will cool more rapidly than the disk (d), owing to the chill acting on the tread, and the hub (a) acting on the swell (C) to cool them more rapidly than the same will the disk (d) on each of its sides in the mold.

To enable others skilled in the art to make and use my improved wheel, I will proceed to describe its construction by referring direct to the accompanying drawings of which, Fig. 1 represents a sectional view of the wheel through its diameter. Fig. 2, is a face view of the wheel, and Fig. 3, is a longitudinal view of the hub or eye of the wheel drawn separately.

The hub of the wheel (a) has a concave channel around its circumference, as represented in Fig. 3, and furnished with a bead or tongue $f, f$, in the bottom of the concave, and has ribs $(g, g)$ cast on opposite sides of the hub, parallel with its length—the beads and ribs $(g, g)$ are for giving additional security for preventing the hub from becoming loose in the wheel.

The hub (a) is first cast as represented, and provided with an opening of a proper size to suit the axle after being bored. The mold of the wheel is then made, and the hub placed in the center of the mold as a core. The mold is then filled with metal, or poured, which completes the wheel in its parts as represented in Fig. 1. The wheel shrinks around the hub sufficient tight to prevent shaking or jarring loose by use, as has been fully tested by some of the wheels thus constructed and used for one year—and yet the shrinking around the wheel is not sufficient to put any part of the wheel on a strain. And by thus making a wheel I obtain one free from all strain, arising from the unequal cooling of its parts.

What I claim as my improvement and desire to secure by Letters Patent is—

First providing the hub (a) with a concave or other formed channel around the center of the circumference and arranging in the said channel the bead, $f, f$, and ribs $(g, g)$ and then with the hub thus constructed, uniting it with the wheel as specified when the parts of the wheel are made and proportioned, all as, and for purposes mentioned in the foregoing specification.

A. L. MOWRY.

Witnesses:
M. BENSON,
NICHOLAS BIRD.